Figure 1:
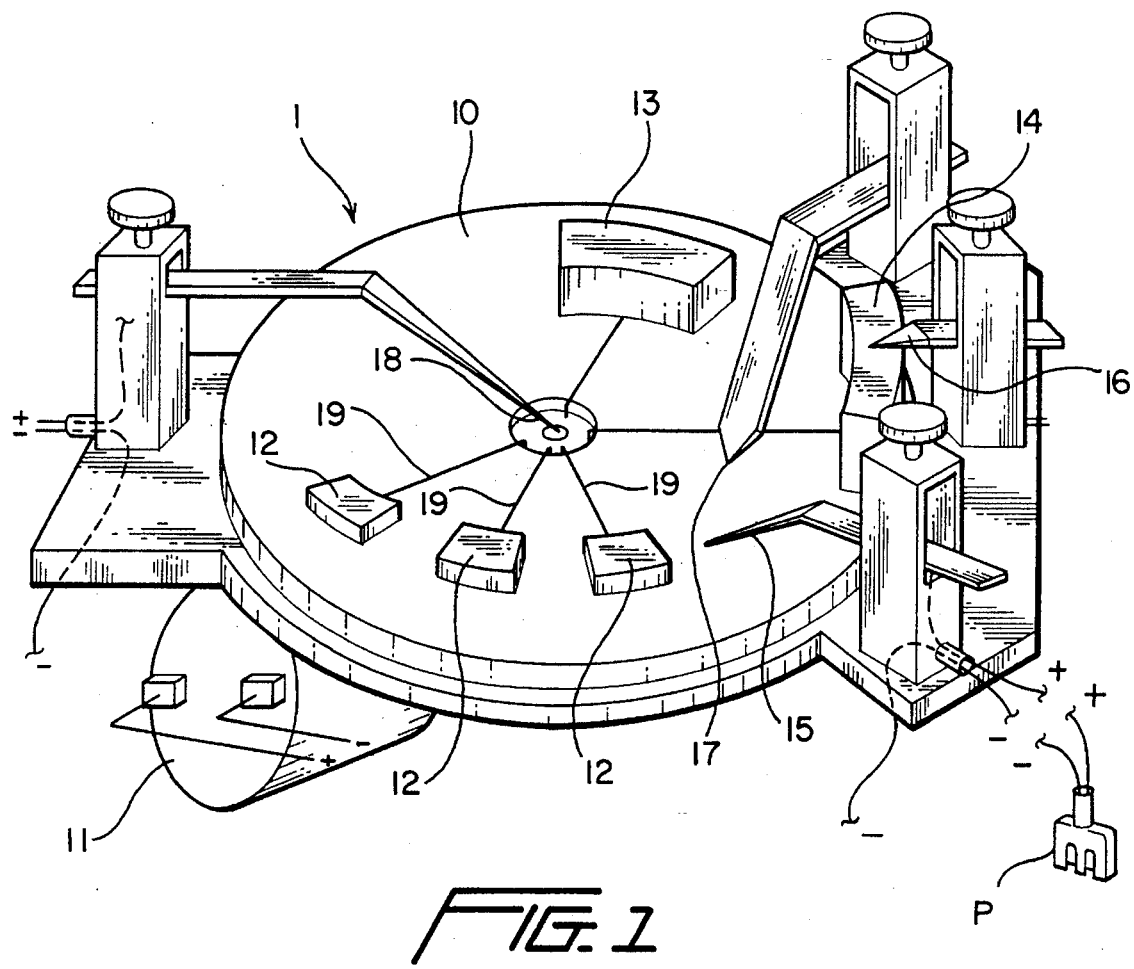

United States Patent [19]

Brusca

[11] Patent Number: 5,512,876
[45] Date of Patent: Apr. 30, 1996

[54] DEVICE FOR THE TIMED LIGHTING OF SIGNAL TRIANGLES ON VEHICLES AND OF TRIANGLES FOR EMERGENCY STOPS

[76] Inventor: Vincenzo Brusca, Via E. Petrolini, 5 0043 Ciampino, Rome, Italy

[21] Appl. No.: 741,502

[22] PCT Filed: Jul. 13, 1990

[86] PCT No.: PCT/IT90/00070

§ 371 Date: Jul. 31, 1991

§ 102(e) Date: Jul. 31, 1991

[87] PCT Pub. No.: WO91/08927

PCT Pub. Date: Jun. 27, 1991

[30] Foreign Application Priority Data

Dec. 12, 1989 [IT] Italy ................................ 48638A/89

[51] Int. Cl.[6] .................................................. B60Q 1/52
[52] U.S. Cl. .............................. 340/471; 40/427; 40/429; 40/430; 40/431; 40/433; 40/470; 40/473; 40/474; 116/63 R; 116/63 T; 116/63 P; 340/473; 340/480; 340/483; 340/478
[58] Field of Search ...................................... 340/473, 480, 340/483, 478, 486, 331; 116/63 T, 63 R, 63 P; 40/433, 427, 473, 474

[56] References Cited

U.S. PATENT DOCUMENTS

| 1,324,923 | 12/1919 | Pfeifer | 340/478 |
| 2,767,390 | 10/1956 | Topley. | |
| 3,646,508 | 2/1972 | Da Silva | 340/901 |
| 4,875,028 | 10/1989 | Chou | 116/63 T |

FOREIGN PATENT DOCUMENTS

| 4760768 | 6/1970 | Australia. |
| 2287010 | 4/1976 | France. |
| 9108927 | 6/1991 | Italy. |
| 1604662 | 12/1981 | United Kingdom. |

*Primary Examiner*—John K. Peng
*Assistant Examiner*—Daryl C. Pope
*Attorney, Agent, or Firm*—Beveridge, DeGrandi, Weilacher & Young

[57] ABSTRACT

The device according to the present invention allows the timed lighting in following phases of the structure and of the signals provided on two kinds of emergency triangles, a first one (2) provided on the vehicle, and a second one (3) that may be seen at distance, when the vehicle is forced to stop due to a damage.

14 Claims, 1 Drawing Sheet

DEVICE FOR THE TIMED LIGHTING OF SIGNAL TRIANGLES ON VEHICLES AND OF TRIANGLES FOR EMERGENCY STOPS

The present invention concerns a device for the timed lighting of signal triangles provided on vehicles and of triangles indicating an emergency stop of a vehicle.

It is already well known that the triangles indicating an emergency stop are not visible in the dark, and that therefore they are often run over by arriving vehicles, with a consequent danger for the safety of people on vehicles having broken down.

In addition, the conventional rear signals of moving vehicles, such as the stops, the lights and the number-plate are not often very evident in conditions of low visibility, at night, with fog and during storms.

It is therefore the aim of the present invention to realize a device for obtaining a timed lighting, in following phases, of the structure and of the signals present on two kinds of emergency triangles, the first one provided on the vehicle and the second one that may be seen at distance when the vehicle has to stop for some reason.

The device according to the present invention will be described more in detail hereinbelow according to the enclosed drawings, in which a preferred embodiment is shown.

FIG. 1 shows a perspective view of the device for the timed distribution of the electric feeding of the various portions of the triangles.

Figure 2:
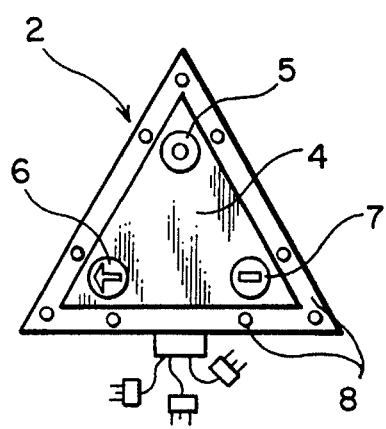
Figure 3:
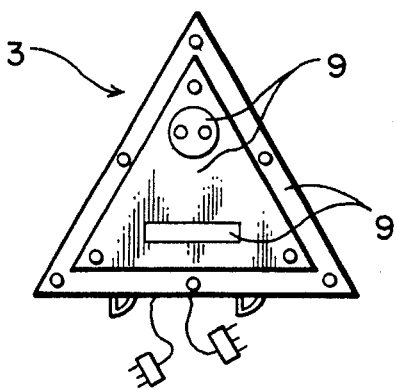

FIGS. 2 and 3 respectively show the triangle placed on the vehicle and used in emergency stops.

Relating now to the details of the figures, the device according to the present invention comprises:

an electromechanical distributor 1, for the timed connection between the accumulator battery of the vehicle and those parts of the triangle that may be lighted;

a signal triangle 2 provided on the vehicle, comprising a bright background 4, a danger signal 5, a signal for overtaking on the left 6, a signal of forbidden direction 7 on the right, and a frame 8 with luminous points;

a triangle for emergency stop 3 with internal signals 9.

In an embodiment of the device according to the present invention, the electromechanical distributor consists of:

turning disc 10, placed into rotation by a small electric motor with a reducer 11;

three kinds of electric contacts 12, 13, 14, out of one piece with the upper plate of said disc 10, placed on offset planes for determining the contacts in successive phases with the terminals offset in height 15, 16, 17, that have the task of leading the electric feeding to the various parts of the triangles 2, 3;

a central contact 18 for the electric connection between the battery of the vehicle and the disc 10, so as to make the current arrive, by means of wires 19, to said contacts 12, 13, 14 which, following to the rotation, arrive in succession under the terminals 15, 16, 17 and from these the current arrives to the small lamps for lightening the elements 4, 5, 6, 7 and 8 of stop triangle 2 and, in alternative, to the elements 9 of the emergency stop triangle 3. As shown in FIG. 1, central contact 18 charges contacts 12, 13, 14 (e.g., a positive charge) such that the overhanging contacts of terminals 15, 16 and 17 become similarly charged when the terminal contacts come in contact with contacts 12, 13 and 14. The terminal contacts are thus placed in electrical communication with the battery at certain points of turning disc rotation. The charge periodically received through the terminal contacts is directed away from the base of a corresponding terminal to form part of a circuit used to energize the prongs of the signal lights shown in FIGS. 2 and 3. The oppositely charged line required to complete a circuit is shown extending into the interior of a terminal where it can be redirected and positioned together with the positively charged line in a suitable receptacle such as plug P (only one of three illustrated) used to receive the pronged plug of the signal lights. As shown, the contact surfaces have a curved outer periphery corresponding to the curved outer periphery of the turning disc and the turning disc rotates on a supporting base free from obstruction. The base also supports the upwardly extending terminals.

A feature of the device according to the present invention is that contact 12 consists in three separate elements that are able to determine the connection, in succession, with said terminal 15 so as to light the respective signal of triangles 2 and 3 in an intermittent way, thus obtaining major signalling results.

I claim:

1. A device for timed lighting of a signal device used in association with a vehicle, comprising an electromechanical distributor having a first electrical connection for connection of said distributor with a vehicle battery and a plurality of signal light electrical connections which provide means for electrically connecting said distributor with lights of the signal device, said distributor further comprising a turning disc, a motor which is in driving communication with said turning disc for rotating said turning disc, a plurality of electrical contacts supported by and extending off from said turning disc, said electrical contacts being in electrical communication with said first electrical connection, and said electrical contacts having contact surfaces that are arranged at different heights with respect to the supporting disc, a plurality of electrical terminals having terminal contacts that are arranged at different heights to correspond with the different heights of said electrical contacts supported by said disc, and said terminals forming part of a respective one of said signal light electrical connections wherein, upon said disc being rotated by said motor, signal lights of the signal device are sequentially fed electrical current when the contact surfaces of said electrical contacts come in contact with a terminal contact of a corresponding height.

2. A device as recited in claim 1 wherein there are three separate types of electrical contacts supported by said disc with each type of electrical contact having a planar surface at a height different from one of the other types.

3. A device as recited in claim 2 wherein a first of said three separate types of electrical contacts includes a plurality of separate contact surfaces.

4. A device as recited in claim 3 wherein said first type of electrical contacts is comprised of three common height electrical contacts.

5. A device as recited in claim 1 wherein said contact surfaces have a curvature corresponding to a peripheral curvature of said turning disc.

6. A device as recited in claim 1 wherein said first electrical connection includes a central contact area on said disc and a plurality of leads leading from said central contact area to respective ones of said electrical contacts supported by said disc as well as a central terminal contact member extending into contact with said central contact area.

7. A device as recited in claim 1 further comprising a base member on which said turning disc is rotatably supported and from which said terminals extend.

8. A device as recited in claim 7 wherein said turning disc is free to rotate without abutting any obstruction in its path.

9. An apparatus, comprising:

an electromechanical distributor having a first electrical connection for connection of said distributor with a vehicle battery and a plurality of signal light electrical connections, said distributor further comprising:

a turning disc, a motor for rotating said turning disc, a plurality of electrical contacts supported by and extending off from said turning disc and spaced from one another, said electrical contacts being in electrical communication with said first electrical connection, and said electrical contacts having contact surfaces that are arranged at different heights with respect to the turning disc, a plurality of electrical terminals having terminal contacts that are arranged at different heights to correspond with the different heights of said electrical contacts supported by said disc, and said terminals forming a part of respective ones of said signal light electrical connections, and said apparatus further comprising a signal device having a plurality of lights in electrical communication with a respective one of said electrical connections, whereby, upon said disc being rotated by said motor, said signal lights are intermittently lit when individual contact surfaces come in contact with a terminal contact of a corresponding height.

10. An apparatus as recited in claim 9 wherein said signal device is a signal triangle adapted for mounting on a vehicle.

11. An apparatus as recited in claim 9 wherein said signal device is an emergency breakdown signal device.

12. An apparatus as recited in claim 9 wherein there are three separate types of electrical contacts supported on said disc with each type having a planar surface at a level different than the other types.

13. An apparatus as recited in claim 12 wherein a first of said three types comprises a plurality of contact members having an upper planar surface which is common among each of said plurality of contact members.

14. An apparatus as recited in claim 10 wherein said signal triangle includes an illuminatable background, an illuminatable danger signal and a plurality of peripheral luminous points.

\* \* \* \* \*